US010241583B2

(12) United States Patent
Lopez Meyer et al.

(10) Patent No.: US 10,241,583 B2
(45) Date of Patent: Mar. 26, 2019

(54) USER COMMAND DETERMINATION BASED ON A VIBRATION PATTERN

(71) Applicant: Intel Corporation, Santa Clara, CA (US)

(72) Inventors: Paulo Lopez Meyer, Zapopan (MX); Hector Alfonso Cordourier Maruri, Guadalajara (MX); Julio Cesar Zamora Esquivel, Zapopan (MX); Alejandro Ibarra Von Borstel, Tlajomulco (MX); Jose Rodrigo Camacho Perez, Guadalajara Jalisco (MX); Jorge Carlos Romero Aragon, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 15/252,175

(22) Filed: Aug. 30, 2016

(65) Prior Publication Data

US 2018/0059797 A1 Mar. 1, 2018

(51) Int. Cl.
*G06F 3/01* (2006.01)
*G06F 3/038* (2013.01)
(Continued)

(52) U.S. Cl.
CPC .............. *G06F 3/017* (2013.01); *G06F 3/038* (2013.01); *G06F 3/0354* (2013.01);
(Continued)

(58) Field of Classification Search
None
See application file for complete search history.

(56) References Cited

U.S. PATENT DOCUMENTS

| 1,823,228 A | 9/1931 | Apfel |
| 1,897,833 A | 2/1933 | Benway |

(Continued)

FOREIGN PATENT DOCUMENTS

| CN | 101742387 A | 6/2010 |
| JP | D3121603 A | 5/1991 |

(Continued)

OTHER PUBLICATIONS

U.S. Appl. No. 14/855,746, entitled Techniques for Gesture Recognition Using Photoplethysmographic (PPMG) Sensor and Low-Power Wearable Gesture Recognition Device Using the Same, filed Sep. 16, 2015.

(Continued)

*Primary Examiner* — Nicholas J Lee
(74) *Attorney, Agent, or Firm* — Schwabe, Williamson & Wyatt, P.C.

(57) ABSTRACT

Embodiments of the present disclosure provide techniques and configurations for an apparatus to determine a command to the apparatus, based on vibration patterns. In one instance, the apparatus may include a body with at least one surface to receive one or more user inputs; at least one sensor disposed to be in contact with the body to detect vibration manifested by the surface in response to the user input, and generate a signal indicative of vibration detected; and a controller coupled with the sensor, to process the vibration-indicative signal, to identify a vibration pattern, and determine a command based at least in part on the vibration pattern, based at least in part on a result of the process of the signal. The command may be provided to interact, operate, or control the apparatus. Other embodiments may be described and/or claimed.

14 Claims, 10 Drawing Sheets

(51) Int. Cl.
*G06F 3/043* (2006.01)
*G06F 3/0354* (2013.01)
*G06F 3/0487* (2013.01)
*G06F 3/0488* (2013.01)

(52) U.S. Cl.
CPC .......... *G06F 3/03547* (2013.01); *G06F 3/043* (2013.01); *G06F 3/0487* (2013.01); *G06F 3/0488* (2013.01); *G06F 2203/04809* (2013.01)

(56) References Cited

U.S. PATENT DOCUMENTS

| | | | |
|---|---|---|---|
| 1,935,923 A | 11/1933 | Thoke | |
| 1,935,932 A | 11/1933 | Benway | |
| 1,940,553 A | 12/1933 | Hugo | |
| 2,045,404 A | 6/1936 | Christ | |
| 2,062,373 A | 12/1936 | Christ | |
| 2,451,317 A | 10/1948 | Blair et al. | |
| 2,613,282 A | 10/1952 | Scaife | |
| 2,813,933 A | 11/1957 | Williams et al. | |
| 2,850,584 A | 9/1958 | Smith | |
| 3,183,312 A | 5/1965 | Jechiel et al. | |
| 4,520,238 A | 5/1985 | Ikeda | |
| 6,285,211 B1 | 9/2001 | Sample et al. | |
| 7,555,136 B2 | 6/2009 | Wang | |
| 7,580,540 B2 | 8/2009 | Zurek et al. | |
| 7,835,999 B2* | 11/2010 | Block | G06F 3/04883 382/157 |
| 8,856,875 B2 | 10/2014 | Aditya | |
| 9,002,020 B1 | 4/2015 | Kim et al. | |
| 9,094,749 B2 | 7/2015 | Xie et al. | |
| 9,872,101 B2 | 1/2018 | Cordourier Maruri et al. | |
| 9,924,265 B2 | 3/2018 | Lopez Meyer et al. | |
| 2003/0228023 A1 | 12/2003 | Burnett et al. | |
| 2005/0149467 A1* | 7/2005 | Ono | A63F 13/10 706/61 |
| 2005/0286734 A1 | 12/2005 | Wang | |
| 2006/0140422 A1 | 6/2006 | Zurek et al. | |
| 2008/0284620 A1 | 11/2008 | Olsson et al. | |
| 2010/0110368 A1 | 5/2010 | Chaum | |
| 2010/0331649 A1 | 12/2010 | Chou | |
| 2011/0003550 A1* | 1/2011 | Klinghult | G06F 1/1684 455/41.3 |
| 2011/0224481 A1 | 9/2011 | Lee | |
| 2011/0308323 A1 | 12/2011 | Oizumi | |
| 2012/0282976 A1 | 11/2012 | Suhami | |
| 2013/0022220 A1 | 1/2013 | Dong | |
| 2013/0044042 A1 | 2/2013 | Olsson et al. | |
| 2013/0159705 A1 | 6/2013 | Leedom, Jr. | |
| 2013/0242262 A1 | 9/2013 | Lewis | |
| 2014/0028546 A1 | 1/2014 | Jeon et al. | |
| 2014/0029762 A1 | 1/2014 | Xie | |
| 2014/0064536 A1 | 3/2014 | Kim et al. | |
| 2014/0112503 A1 | 4/2014 | Hebenstreit | |
| 2014/0161287 A1 | 6/2014 | Liu et al. | |
| 2014/0275852 A1 | 9/2014 | Hong et al. | |
| 2014/0297217 A1 | 10/2014 | Yuen | |
| 2014/0378113 A1 | 12/2014 | Song et al. | |
| 2015/0031964 A1 | 1/2015 | Bly et al. | |
| 2015/0035759 A1 | 2/2015 | Harrison et al. | |
| 2015/0070148 A1* | 3/2015 | Cruz-Hernandez | G08B 6/00 340/407.1 |
| 2015/0070290 A1 | 3/2015 | Carrone et al. | |
| 2015/0074797 A1 | 3/2015 | Choi et al. | |
| 2015/0123991 A1* | 5/2015 | Yarosh | G02B 27/017 345/629 |
| 2015/0135310 A1 | 5/2015 | Lee | |
| 2015/0160622 A1 | 6/2015 | Kim et al. | |
| 2015/0185838 A1 | 7/2015 | Camacho-Perez et al. | |
| 2015/0289820 A1 | 10/2015 | Miller et al. | |
| 2016/0070245 A1 | 3/2016 | Lee et al. | |
| 2016/0077651 A1* | 3/2016 | Na | G02B 27/017 345/173 |
| 2016/0091980 A1 | 3/2016 | Baranski et al. | |
| 2016/0246368 A1 | 8/2016 | Camacho-Perez et al. | |
| 2016/0282945 A1 | 9/2016 | Ochoa | |
| 2016/0284135 A1 | 9/2016 | Zamhi | |
| 2016/0378193 A1 | 12/2016 | Rodrigo | |
| 2017/0078788 A1 | 3/2017 | Meyer | |
| 2017/0090583 A1 | 3/2017 | Zamora Esquivel et al. | |
| 2017/0139480 A1* | 5/2017 | Tuovinen | G06F 3/016 |

FOREIGN PATENT DOCUMENTS

| | | |
|---|---|---|
| KR | 10-2011-0068579 A | 6/2011 |
| KR | 10-2012-0080852 A | 7/2012 |
| KR | 10-2013-0035290 A | 4/2013 |
| WO | 2015123771 A1 | 8/2015 |
| WO | 2016-069052 A1 | 5/2016 |

OTHER PUBLICATIONS

U.S. Appl. No. 14/854,927, entitled "System for Voice Capture Via Nasal Vibration Sensing," Sep. 15, 2015.
U.S. Appl. No. 14/965,095, entitled "System for Sound Capture and Generation Via Nasal Vibration," filed Dec. 10, 2015.
Rumble strip, Wikipedia,<<https://en.wikipedia.org/wiki/Rumble_strip>> last visited Aug. 30, 2016.
7BB-20-6L0, Piezoelectric Diaphragms, Sound Components, <<http://www.murata.com/en-us/products/productdetail?partno=7BB-20-6L0,>> last visited Aug. 30, 2016.
U.S. Appl. No. 15/046,894, entitled "Technologies for Shifted Neural Networks", filed Feb. 18, 2016.
International Search Report and Written Opinion dated Oct. 30, 2017, issued in related International Application No. PCT/2017/044243, 17 pages.
International Search Report issued in PCT Application No. PCT/US2016/047206, dated Oct. 27, 2016, 12 pages.
Tamura,Toshiyo, et al.,: "Wearable Photoplethysmographic Sensors—Past and Present", Electronics, No. 3, 2014, pp. 282-302, DOI:10.3390/electronics3020282.
H. Han, J_ Kim, "Artifacts in wearable photoplethysmographs during daily life motions and their reduction with least mean square based active noise cancellation method", Computers in biology and medicine, 42(4), Apr. 2012, pp. 387-393, Abstract only.
K.F. Teng, Y.T. Zhang, "The effect of contacting force on photoplethysmographic signals", Physiological Measurement, No. 25, Aug. 11, 2004, pp. 1323-1335, Abstract only.
Park, C.R. Farrar, A. C. Rutherford, A.N. Robertson, "Piezo-Sensor Self-Diagnostics Using Electrical Impedance measurements", Los Alamos National Laboratory, Technical Report LA-UR-04, Oct. 24-27, 2004, 17 pages.
Myo Armband, hllps://www.thalmic.com/myo, downloaded Mar. 22, 2017, 5 pages.
Chianura, A., et al.: "Electrooptical muscle contraction sensor", Medical & biological engineering & computing, 48(7), pp. 731-734, Jul. 2010, 12 pages.
Raghavendra, J.: "Optomyography: detection of muscle surface displacement using reflective photo resistor", MSc. Thesis, KTH Technology and Health, Stockholm, Aug. 2014, pp. 1-31.
Cheng, E.Y., et al.: "Forehead pulse oximetry compared with finger pulse oximetry and arterial blood gas measurement", Journal of Clinical Monitoring, Jul. 4, 1988, vol. 4, Issue 3, pp. 223-226, Abstract only.
Barry, D.T., et al: "Acoustic myography as a control signal for an externally powered prosthesis", Archives of Physical Medicine and Rehabilitation, vol. 67, No. 4, Apr. 1986, pp. 267-269, Abstract only.
Overly, T.G., et al: "Piezoelectric active-sensor diagnostics and validation using instantaneous baseline data", IEEE Sensors Journal, vol. 9, No. 11, Nov. 2009, pp. 1414-1421, Abstract only.
Lim, J. M., et al: "Recognizing hand gestures using wrist shapes". In Consumer Electronics {ICCE), 2010 Digest of Technical Papers International Conference, IEEE, Jan. 2010, pp. 197-198, Abstract only.
Alian, A. A., et al: "Photoplethysmography." Best Practice & Research Clinical Anaesthesiology, 28(4), Dec. J014, pp. 395-406, Abstract only.

(56) References Cited

OTHER PUBLICATIONS

Mason, W.P., et al.: "Methods for Measuring Piezoelectric, Elastic, and Dielectric Coefficients of Crystals and : eramics", Proceedings of the IRE.vol. 42, Jun. 6, 1954, 1 page, Abstract only.
Harrison, Chris, et al.: "Skinput: Appropriating the Body as an Input Surface", http://www.chrisharrison.net/index.php/Research/Skinput, downloaded Mar. 22, 2017, 10 pages.
Final Office Action issued in U.S. Appl. No. 14/965,095, dated May 2, 2017, 21 pages.
U.S. Office Action issued in U.S. Appl. No. 14/965,095, dated Oct. 21, 2016.
International Search Report and Written Opinion issued in PCT Application No. PCT/US2016/047089, dated Oct. 26, 2016.
Hakansson et al., "Resonance Frequencies of the Human Skull in Vivo Department of Applied Electronics", Chalmers University of Technology, Gothenburg, Sweden, Nov. 12, 1993.
Carter, et al., "Estimation of the Magnitude-Squared Coherence Function Via Overlapped Fast Fourier Transform Processing", IEEE Transactions on Audio and Electroacoustics, vol. AU-21, No. 4, Aug. 1973.
Welch, "The Use of Fast Fourier Transform for the Estimation of Power Spectra: A Method Based on Time Averaging Over Short, Modified Periodograms", IEEE Transactions on Audio and Electroacoustics, vol. AU-15, No. 2, Jun. 1967.
Interational Search Report and Written Opinion issued in PCT Application No. PCT/US2016/061420, dated Jan. 18, 2017, 15 pages.
Piezoelectric Sound Components, muRata catalogue, May 2014.
U.S. Office Action issued in U.S. Appl. No. 14/854,927, dated Sep. 1, 2016.
Final Office Action dated Sep. 13, issued in related U.S. Appl. No. 14/855,746, 49 pages.
Non-Final Office Action dated Apr. 5, 2017, issued in related U.S. Appl. No. 14/855,746, 16 pages.
Gradient descent, retrieved on Mar. 22, 2018 from URL <<https://en.wikipedia.org/wiki/Gradient_descent>>.
K-means clustering, retrieved on Mar. 22, 2018 from URL <<https://en.wikipedia.org/wiki/K-means_clustering>>.

\* cited by examiner

USER COMMAND DETERMINATION BASED ON A VIBRATION PATTERN

FIELD

Embodiments of the present disclosure generally relate to the field of computing, and more particularly, to wearable devices having sensor devices configured to facilitate identification of commands to interact, operate or control the wearable devices, based on vibration patterns resulting from the user input.

BACKGROUND

Portable or wearable devices continue to increase in popularity, and feature increasingly sophisticated functionality. These devices need to have an input interface for the user in order to control the device, either by adding hardware in the form of electronic buttons, or by an external communication device, e.g., remote control, smart phone application, or the like. However, the use of electronic or touch screen buttons may be frustrating for the user, because it may be difficult to identify and/or use a specific button or other interface component, given the limited size of a keyboard or a screen of the device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for an apparatus and method for determination of a command to the apparatus, based on vibration patterns. In some embodiments, the apparatus may include a body of the apparatus, with at least one surface to receive one or more user inputs to convey a command to the apparatus. The apparatus may further include at least one sensor disposed to be in contact with the body of the apparatus to detect vibration manifested by the surface in response to the user input, and generate a signal indicative of the detected vibration. The apparatus may further include a controller coupled with the sensor, to process the vibration-indicative signal, to identify a pattern of vibration, and determine the command based at least in part on the vibration pattern. The command may be provided to interact, operate, or control the apparatus.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
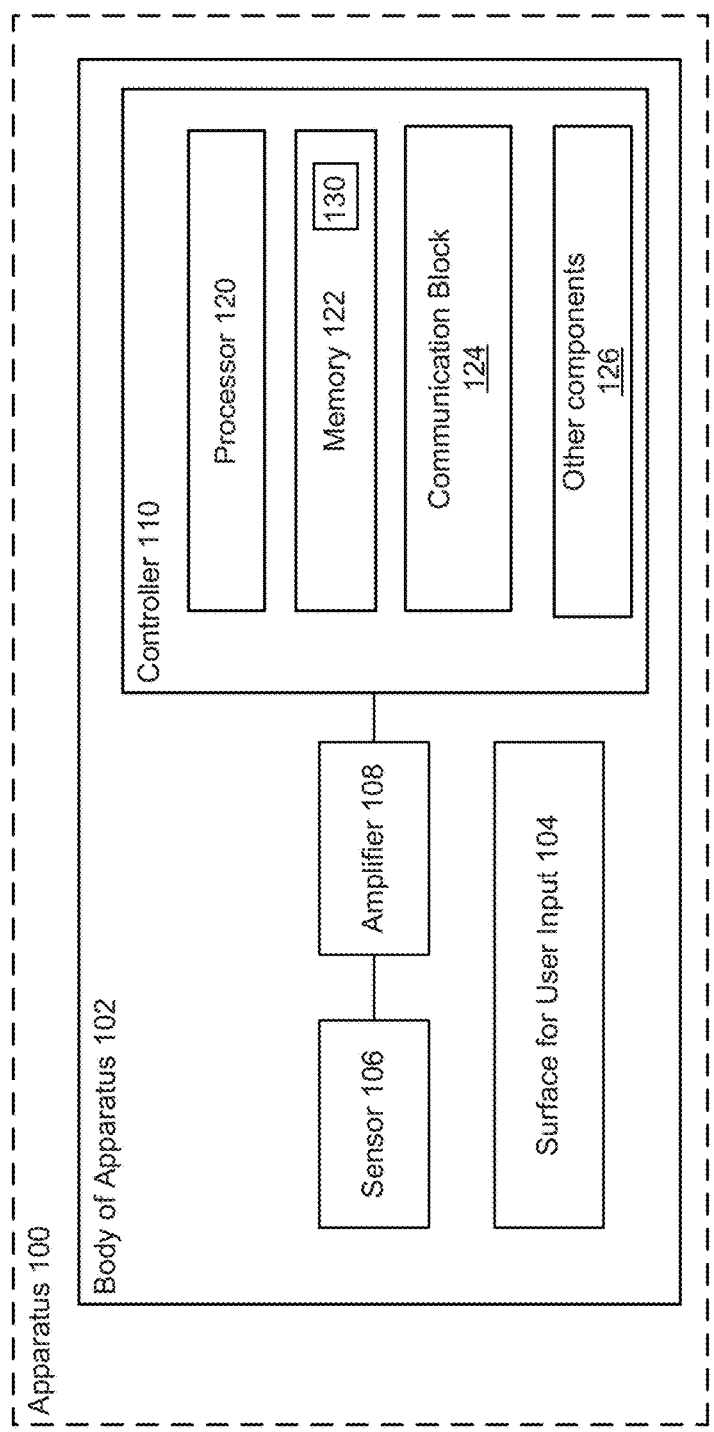
FIG. 1 is a diagram illustrating an example apparatus equipped with the technology for determination of user commands based on vibration patterns, in accordance with some embodiments.

FIG. 1 is a diagram illustrating an example apparatus equipped with the technology for determination of user commands, based on vibration patterns, in accordance with some embodiments. The apparatus 100 may comprise a wearable device, a portable device, or, more generally, any type of a computing device that may include means for user tactile interaction with the device. While examples of specific implementations (e.g., in headwear) and/or technologies (e.g., piezoelectric sensors, wireless communications, etc.) may be employed herein, these examples are presented merely to provide a readily comprehensible perspective from which the more generalized devices, methods, etc. described herein may be understood.

As noted above, the apparatus 100 may comprise a wearable device. In embodiments, the apparatus 100 may comprise eyeglasses, as described in greater detail with reference to FIG. 7.

The apparatus 100 may include a body of the apparatus 102. The body 102 of the apparatus 100 may include at least one surface 104 configured to receive one or more user inputs to convey a command to the apparatus 100. The user may provide e.g., a series of tactile inputs to the surface 104.

The surface 104 may manifest a vibration pattern in response to a particular series of user inputs. The vibration with a particular pattern may be propagated through the body 102 of the apparatus 100. The apparatus 100 may be configured to sense and identify the pattern of vibration. The command corresponding to the identified vibration pattern, when determined, may be generated to interact, operate or control the apparatus 100.

The surface 104 may include a smooth surface, a rough surface, a surface with a surface pattern, or a combination thereof. The surface pattern may include one or more surface elements (e.g., bumps, lines, geometric figures, or other shapes) that may be disposed in a pattern on the body 102, as described in greater detail in reference to FIG. 2.

At least one sensor 106 may be disposed on or inside the apparatus 100, such as to be in contact with the body 102, in order to detect vibration generated by the surface 104 in response to the user input, and generate a signal indicative of the detected vibration. For example, the sensor 106 may be mounted on the body 102 via mechanical attachment (e.g., screw, nail or other fastener), adhesive attachment (e.g., a glue, epoxy, etc.) or may be incorporated within the structure of the body 102. In embodiments, the sensor 106 may comprise vibration sensing circuitry. The sensing circuitry may comprise, for example, piezoelectric components such as a diaphragm or other piezoelectric transducer, to convert into signals vibration (e.g., mechanical pressure waves) occurring in the body 102 in response to a user input to the surface 104.

The apparatus 100 may further include a controller device 110, which may also be disposed on the apparatus 100, e.g., in the body 102. The controller device 110 may be electrically and/or communicatively coupled with the sensor 106, to receive and process the signal provided by the sensor 106, as described below. In embodiments, the controller device 110 may be coupled with the sensor 106 via an amplifier 108. The amplifier 108 may be configured to amplify and condition the sensor signal indicative of vibration, and to provide the amplified and conditioned signal to the controller device 110 for processing.

The controller device 110 may be configured to process the sensor signal indicative of vibration, to identify a pattern of vibration and determine a command that corresponds to the pattern of vibration. Based on the determined command, the controller device 110 may generate the command to interact, operate or control the apparatus 100. The commands may include various functions to control the apparatus 100, e.g., powering on or off, initializing different apparatus functions, providing alphanumeric inputs to a password prompt or application prompt, and the like.

To process the sensor signal, the controller device 110 may include components configured to record and process the readings of the signal. The controller device 110 may provide these components through, for example, a plurality of machine-readable instructions (e.g., signal processing block 130) stored in a memory 122 and executable on a processor 120. The controller device 110 may record the sensor signal and store (e.g., buffer) the recorded readings, for example, in the memory 122, for further analysis and processing, e.g., in real time or near-real time.

The processor 120 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like.

Examples of support circuitry may include host side or input/output (I/O) side chipsets (also known as northbridge and southbridge chipsets/components) to provide an interface through which the processor 120 may interact with other system components that may be operating at different speeds, on different buses, etc. in the apparatus 100. Some or all of the functionality commonly associated with the support circuitry may also be included in the same physical package as the processor.

The memory 122 may comprise random access memory (RAM) or read-only memory (ROM) in a fixed or removable format. RAM may include volatile memory configured to hold information during the operation of apparatus 100 such as, for example, static RAM (SRAM) or Dynamic RAM (DRAM). ROM may include non-volatile (NV) memory circuitry configured based on basic input/output system (BIOS), Unified Extensible Firmware Interface (UEFI), etc. to provide instructions when apparatus 100 is activated, programmable memories such as electronic programmable ROMs (erasable programmable read-only memory), Flash, etc. Other fixed/removable memory may include, but is not limited to, electronic memories such as solid state flash memory, removable memory cards or sticks, etc.

The controller device 110 may further include other components necessary for functioning of the apparatus 100. For example, the controller device 110 may include a communication block 124, which may include one or more radios capable of transmitting and receiving signals (e.g., to an external device, not shown) using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 124 may operate in accordance with one or more applicable standards in any version. To this end, the communication block 124 may include, for instance, hardware, circuits, software, or any combination thereof that allows communication with external computer systems.

In some specific non-limiting examples, the communication block 124 may comport with the Institute of Electrical and Electronics Engineers (IEEE) 802.11 standard (e.g., Wi-Fi), a Bluetooth®, ZigBeet, near-field communication, or any other suitable wireless communication standard. In addition, the communication block 124 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

The controller device 110 may include other components 126 that may be necessary for functioning of the apparatus 100. Other components 126 may include, for example, a power circuitry block configured to provide power supply to the components of the apparatus 100. The power circuitry block may include internal power sources (e.g., battery, fuel cell, etc.) and/or external power sources and related circuitry configured to supply apparatus 100 with the power needed to operate. Other components 126 may further include various output mechanisms (e.g., speakers, displays, lighted/flashing indicators, electromechanical components for vibration, motion, etc.). The hardware in other components 126 may be incorporated within the controller device 110 and/or may be external to the controller device 110.

Figure 2:
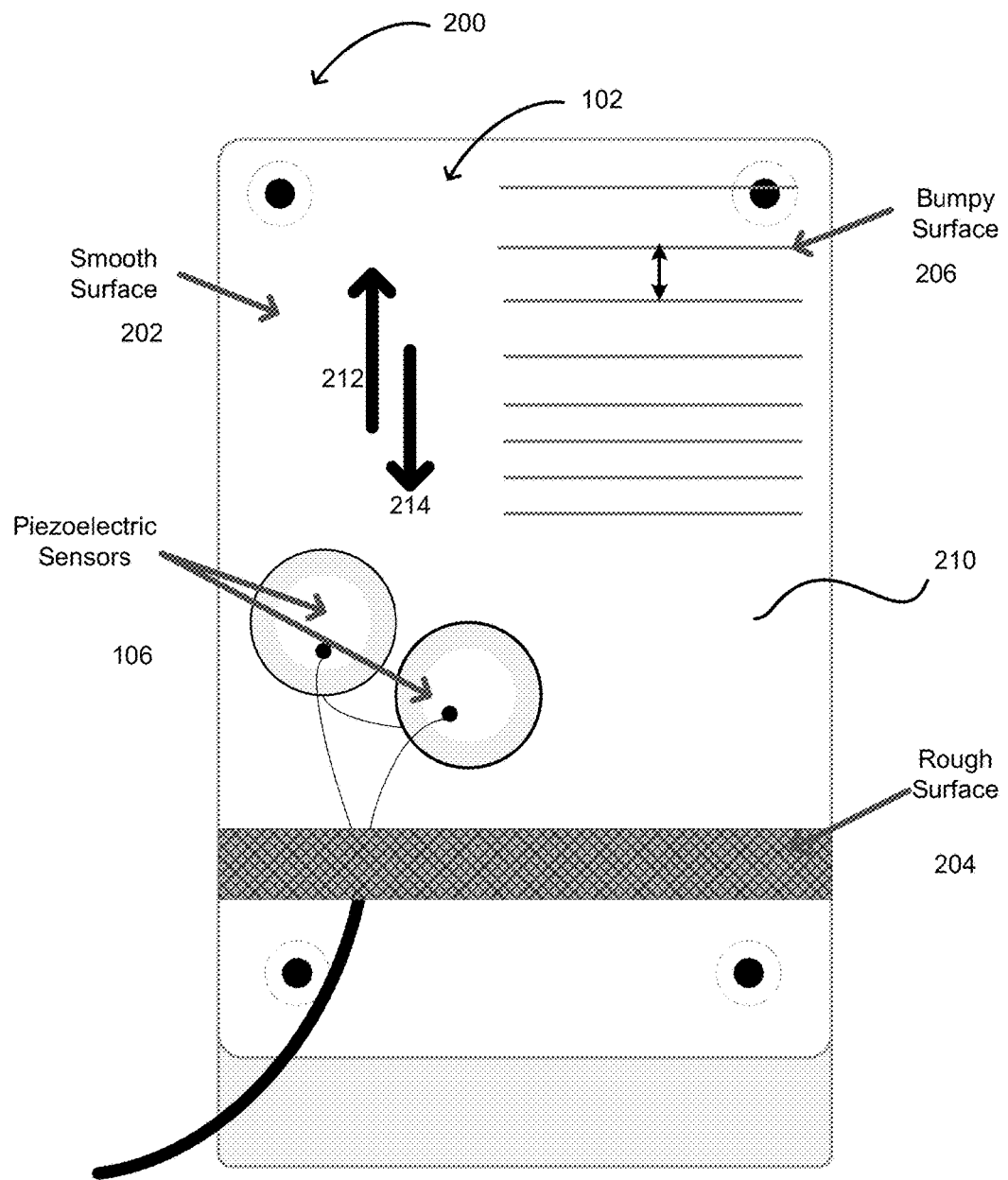
FIG. 2 is an example illustration of some aspects of the apparatus of FIG. 1, in accordance with some embodiments.
Figure 3:
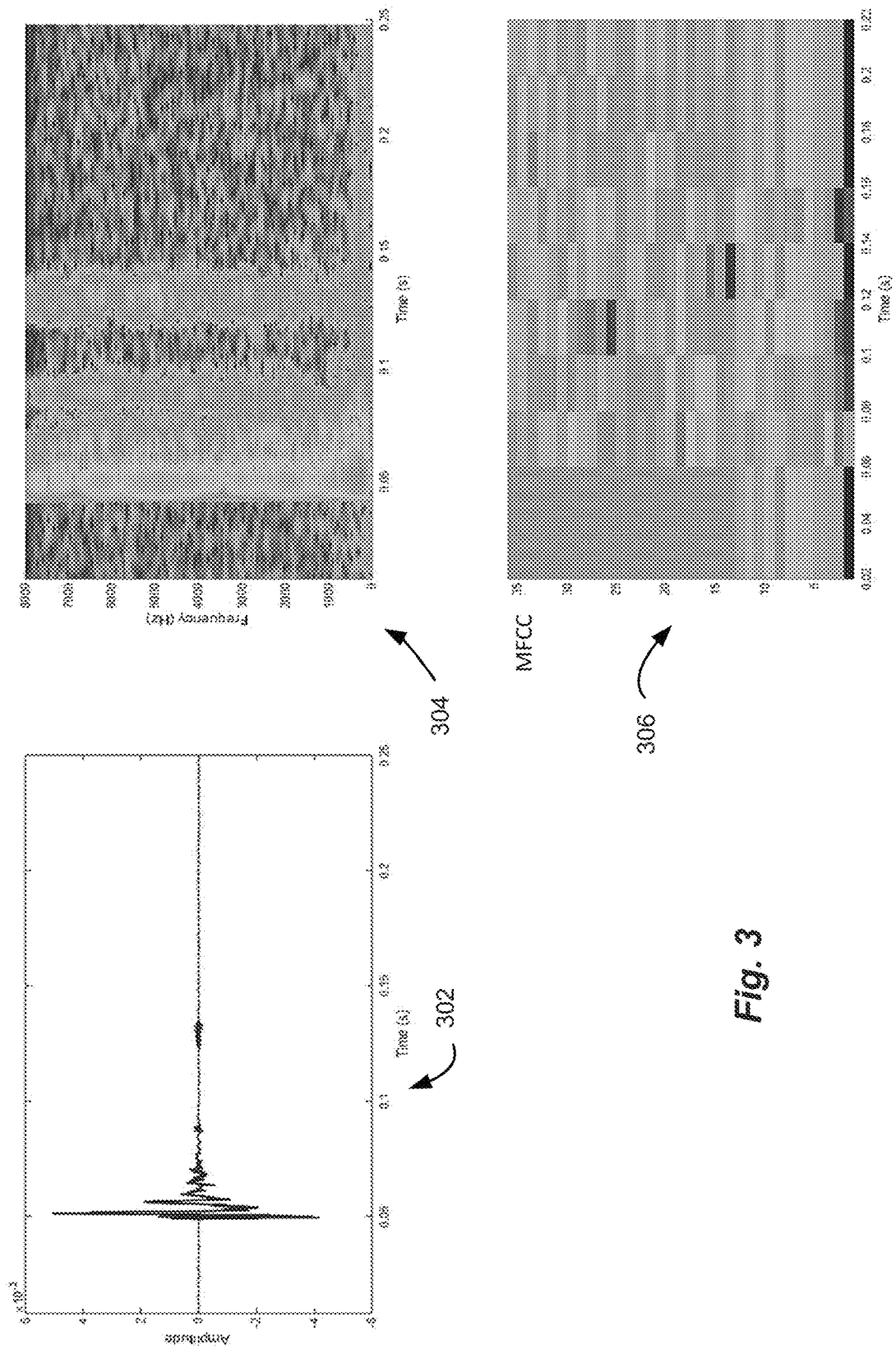
FIGS. 3-6 illustrate example graphs showing results of detecting vibration patterns, in accordance with some embodiments.
Figure 4:
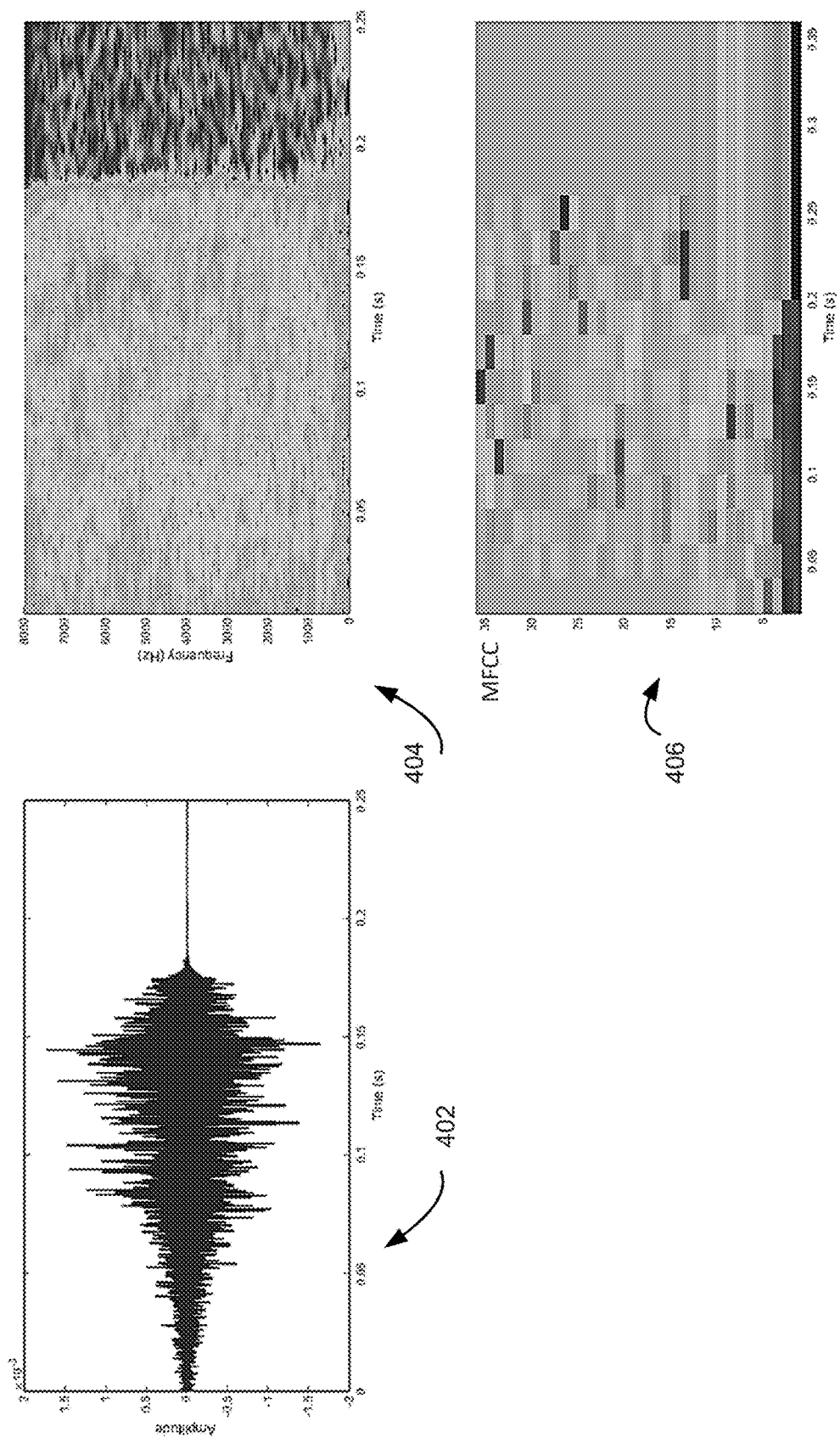
Figure 5:
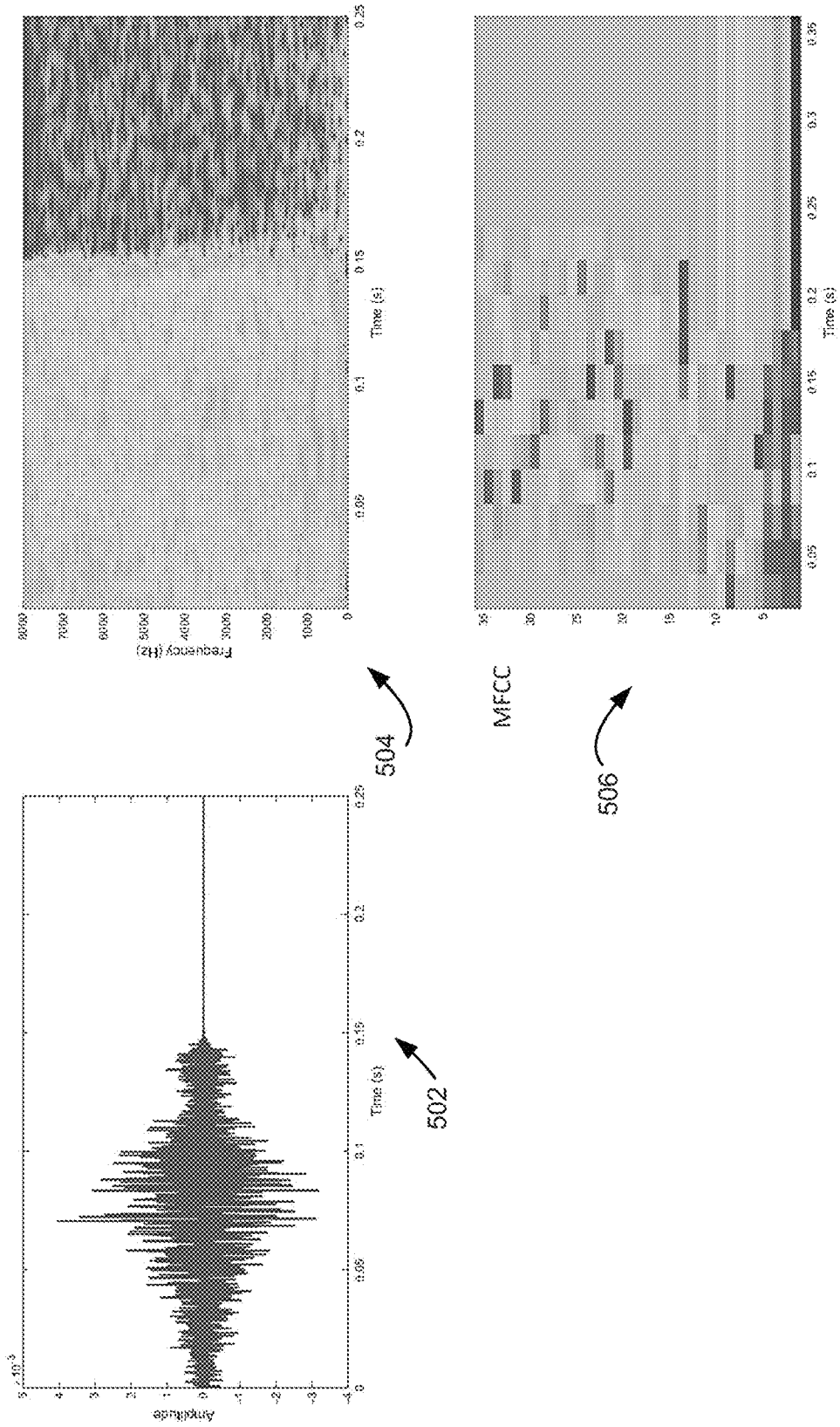
Figure 6:
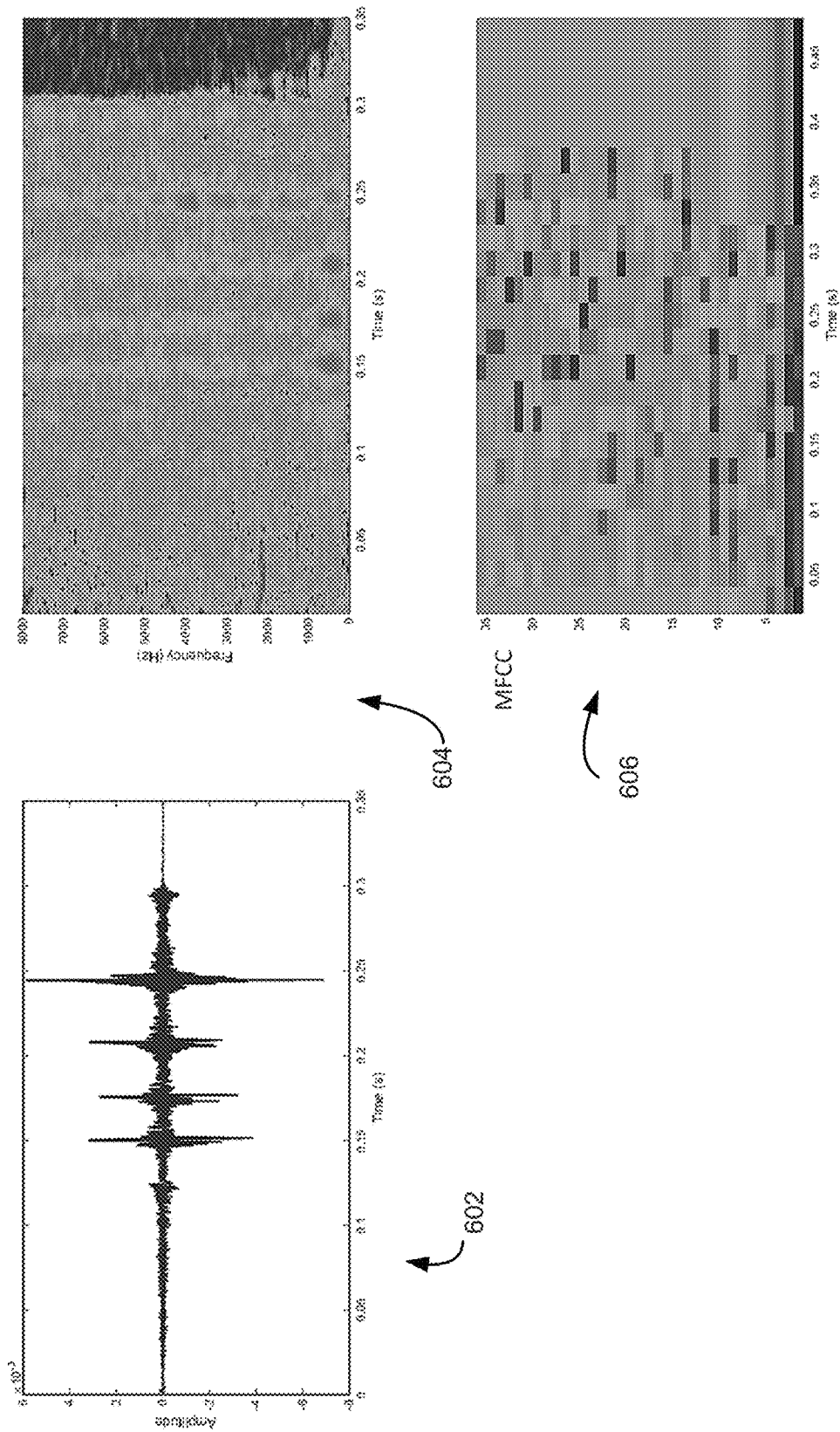

FIG. 2 is an example illustration of some aspects of the apparatus of FIG. 1, in accordance with some embodiments. For ease of understanding, like components of FIGS. 1 and 2 are indicated by like numerals. More specifically, FIG. 2 illustrates exemplary surfaces which when combined with a sensor, may be used to capture user input across the surfaces as vibrations. The captured vibrations may in turn be translated into commands or gestures.

In a setup 200 of FIG. 2, two sensors 106 (e.g., piezoelectric transducers) may be connected in series and coupled to an amplifier, such as a MOTU amplifier to condition the sensor signal. Each sensor may be composed of a metallic disk and a thin layer of piezoelectric material (Murata® 7BB-20-6L0). As shown, the sensors 106 may be affixed to the body 102 of the apparatus 100.

Vibration to be sensed by the sensors 106 may occur in response to the user input to (interaction with) one or more surfaces (e.g., surface 104 of FIG. 1) configured to receive user input and placed on the body 102. The example surfaces shown on 200 are described for ease of understanding and are not limited to this disclosure. Different types of surfaces may be employed to receive user input and generate vibration in response to the input. The example surfaces of FIG. 2 may include a smooth surface 202, a rough surface 204, a surface with a pattern (e.g., bumpy surface) 206, or a combination thereof. User input may include different user interaction with different types of surfaces. For example, user input may include a one-finger tap over the smooth surface 202. In another example, user input may be a drag of one or more fingers along the rough surface 204.

The surface with a pattern 206 may include different surface elements disposed in a particular pattern on the surface of the apparatus body. For example, the surface 206 may include an array of bumps or recesses 210 that may be disposed along the surface 206 with equal or different (e.g., progressively increasing) distance between each other, as shown in FIG. 2. Accordingly, the user input may include a drag of a finger along the surface 206. When the distance between the bumps or recesses differs (e.g., progressively increases), the pattern of a vibration signal generated in response to a finger drag along the surface in one direction (e.g., 212) may differ from the pattern of a vibration signal generated in response to a finger drag in the opposite direction (214).

Accordingly, a combination of a user input to a particular surface may be characterized as a gesture. The gestures may include (and are not limited to), for example, one or more taps over the smooth surface, drag over a rough surface, drag over a surface with a pattern in one direction, drag over the surface with the pattern in the opposite direction, or any combination thereof. Each gesture, identified based on determined vibration pattern, may correspond to a particular command to control the apparatus 100 of FIG. 1. The command may indicate an operation to be performed by the apparatus, e.g., powering on or off the apparatus, turning on and off different apparatus functions. The command may also serve to interact with the apparatus, such as to enter information (e.g., passcodes), and the like.

More generally, different surface textures or a set of regular or irregular patterns disposed along the surface of a body of an apparatus (e.g., a wearable device) may introduce additional differentiating features to the vibration patterns generated in response to different user interactions with the surface (e.g., finger taping or dragging along the surface). Different vibration patterns may be used to differentiate among different gestures and may be further associated with different commands to the apparatus. The sensors 106 may be able to generate a signal indicative of a vibration pattern, which may be processed to identify a user gesture (e.g., user input on a particular surface of the apparatus), and generate a corresponding command to control the apparatus. In other words, a vibration pattern, when identified, may indicate a command to control the apparatus.

To evaluate the vibration pattern differences, data from different gestures, e.g., finger-tap over the smooth surface, drag on smooth area, drag on rough surface, and drag over bumpy surface may be collected. Each gesture may be repeated multiple times, e.g., ten times, to have a total of forty user inputs.

FIGS. 3-6 illustrate example graphs showing results of detecting vibration patterns, in accordance with some embodiments. More specifically, graphs 302, 402, 502, and 602 illustrate example representations of the electronic (e.g., piezoelectric) signal captured during testing on the surfaces shown in FIG. 2, in accordance with some embodiments. The signals detected by the sensor are shown as function of time, for the following gestures: tap on a smooth surface (302), drag on a smooth surface (402), drag on a rough surface (502), and drag on a surface with a pattern (602). The signal may be recorded at a sample frequency of 41 kHz, and down sampled to 16 kHz for post-processing analysis. The timing of the signal (shown on X-axis) may be divided into 250 ms non-overlapping windows ti (for i=1, n number of windows) to obtain a spectrogram Si using the short-time Fourier transform.

Graphs 304, 404, 504, and 604 illustrate the respective spectrograms of the sensor signals 302, 402, 502, and 602. Graphs 306, 406, 506, and 606 illustrate the pattern that correspond to the signals illustrated in graphs 302, 402, 502, and 602 respectively. The features of the signal may be used to identify or classify a particular vibration pattern. For example, a signal feature may include the mel-frequency cepstral coefficients (MFCC) of the vibration signal generated by the sensor.

The apparatus with determination of user commands based on vibration patterns described herein may be easily adopted in the day-to-day life of a user, for example, in a wearable device, such as eyewear (eyeglasses, sunglasses, safety glasses, or the like) that may be routinely worn by people.

Figure 7:
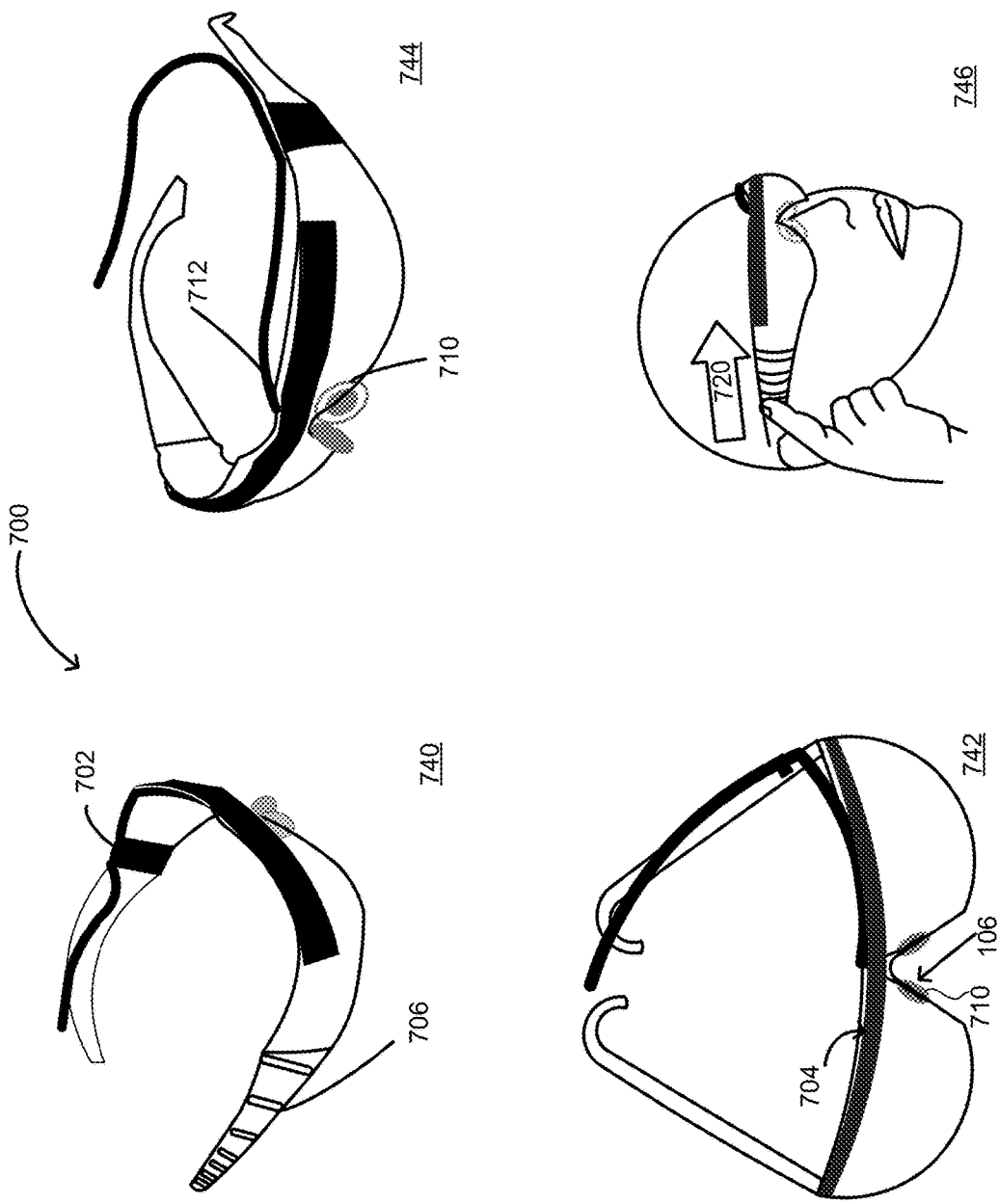
FIG. 7 illustrates an example implementation of the apparatus of FIG. 1, in accordance with some embodiments.

FIG. 7 illustrates an example implementation of the apparatus of FIG. 1, in accordance with some embodiments. In this example, the apparatus 100 may be implemented in eyewear, such as safety eyewear glasses 700, different views of which are shown in FIG. 7.

In embodiments, one or more piezoelectric sensors 106 connected in series (similar to the ones shown in FIG. 2) may be placed on the nasal support (nose pads) 710 of a pair of eyeglasses 700.

The surfaces to receive user input may be provided in different parts of the eyeglasses 700. For example, a smooth surface 702 (similar to 202) may be provided on the left side of the glasses 700, as shown in view 740. A rough surface 704 (similar to 204) may be placed in the frontal part of the glasses 700, as shown in view 742. A surface with a pattern 706 (similar to 206) may be disposed on the right side of the glasses 700, as shown in view 740. As indicated by an arrow 720 in view 746, a user may perform a user input in a form of a drag over the surface 706. In addition to the gestures described above, a tap over a bridge 712 above the nose pads 710 of the eyeglasses 700 may be used, as shown in view 744.

In embodiments, a controller device (e.g., 110 of FIG. 1, not shown in FIG. 7) may also be mounted on the eyeglasses 700, e.g., on the sides or the front part. The controller device 110 may be communicatively coupled with the sensors 106 to enable signal transmission from the sensors 106 to the controller device 110. Understandably, the controller device 110 may be mounted in other suitable areas of a respective wearable device, depending on the wearable device configuration.

In general, the apparatus 100 may comprise any wearable device, such as a headset, a helmet, diadems, caps, hats, arm bands, knee bands, or other types of headwear, body wear, wrist wear, or arm wear. It may also be applied to stationary devices like desktops, laptops, smart TVs, smart homeware and kitchenware, cars, etc. The sensors may be disposed in different areas of the wearable device such as to provide a contact with the body of the device, in order to sense vibration produced by different types of user input on one or more surface disposed on the device.

Figure 8:
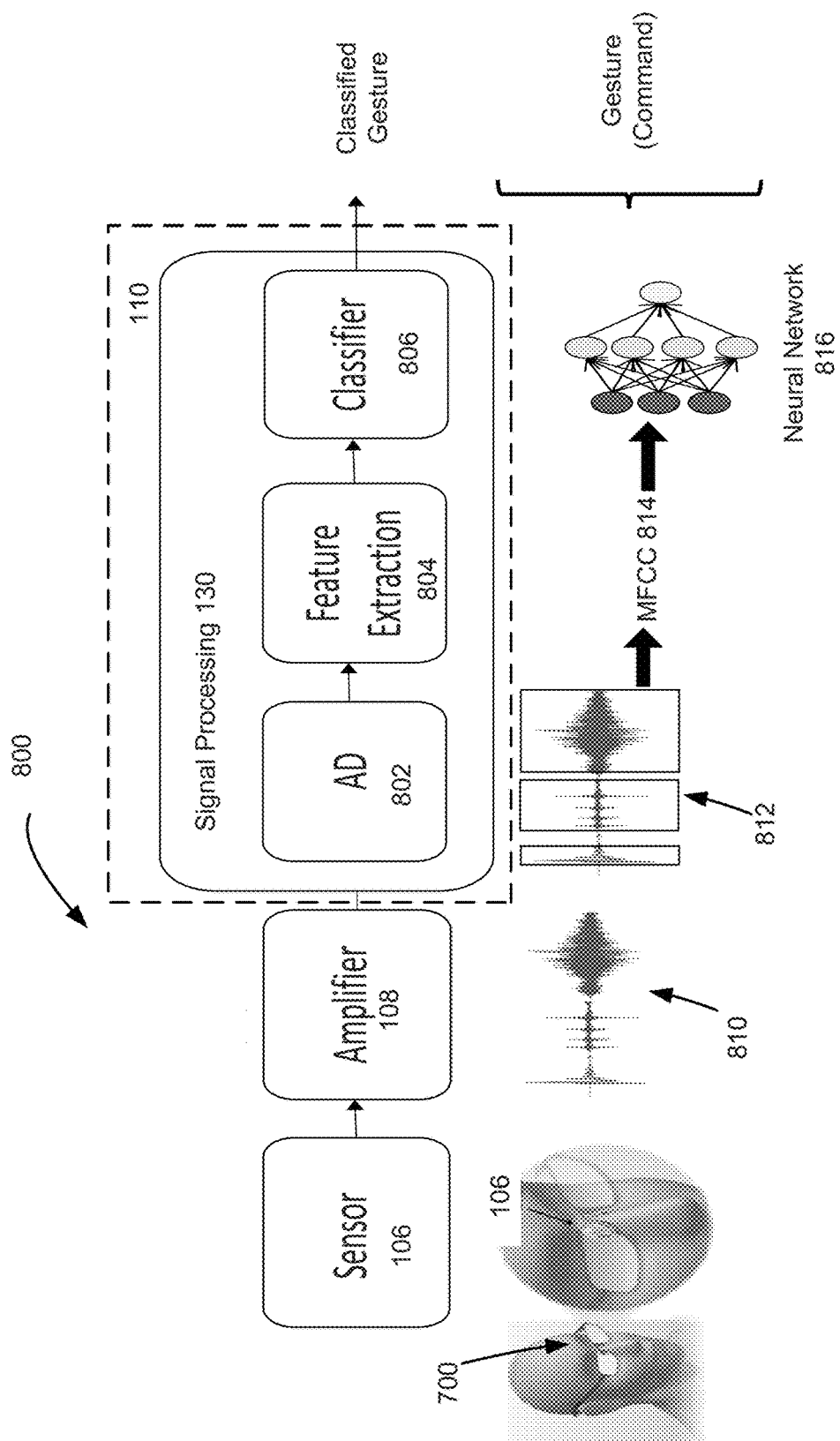
FIG. 8 is a block diagram illustrating some aspects of sensor signal processing by the apparatus of FIG. 1, in accordance with some embodiments.

FIG. 8 is a block diagram illustrating some aspects of sensor signal processing by the apparatus of FIG. 1, in accordance with some embodiments. For ease of understanding, like components of FIGS. 1, 7, and 8 are indicated by like numerals.

More specifically, the block diagram 800 illustrates the components and operation of the signal processing block 130 briefly described in reference to FIG. 1. As described in reference to FIG. 1, the apparatus 100 may include one or more sensors 106 disposed on the body of the apparatus 100. The sensor signal generated in response to vibration produced by the body of the apparatus 100 (e.g., eyeglasses 700) may be provided, via the amplifier 108, to the controller device 110.

In embodiments, the signal processing block 130 may be implemented as a recognition engine, which may include an activity (user input) detection block (AD) 802, a feature extraction block 804, and a user input classifier 806.

The signal from the piezoelectric sensors 106 may be amplified by the amplifier 108. Subsequently, the AD 802 may be used to segment the signal into signal portions with possible control-related user input. The AD 802 may be amplitude-based. In other words, block 802 may detect user input based on the amplitude of vibration signal (e.g., 302, 402, 502, or 602, also indicated by numeral 810 in FIG. 8). For example, if for a given period of time the average signal amplitude is above a threshold, it may be determined that a user input of some type has occurred.

For example, if for a given epoch (reference time) of sampled data points (e.g., 1024 data points) of the signal (64 ms), the average amplitude is above a threshold $Th=2\times10^{-4}$, the AD 802 may begin collecting data until the average of the incoming epochs drops below Th. Accordingly, the segment, e.g., a portion of the signal (frame) within the identified time period, within which the user input occurred, may be identified.

The segmented parts 812 of the signal 810 may serve as the inputs to the feature extraction block 804. For the captured candidate segment, the feature extraction block 804 may extract features indicative of the vibration pattern. As discussed above, the features may comprise mel-frequency cepstral coefficients (MFCC), spectral representations of which are shown in graphs 306, 406, 506, and 606. Multiple MFCC may be calculated for the signal segment. For example, 12 MFCC may be calculated over 20 ms window frames, together with its derivatives, e.g., deltas and double deltas, resulting in a feature vector for each frame of MFCC dimensionality. While MFCC may be chosen as features in some embodiments because they may represent more efficient features for classification of user input, any other signal pattern indicating features may also be used.

The MFCC features may be used as inputs for the user input classifier 806. The MFCC may represent the variable features to be used by a classifier methodology to discriminate among different vibration patterns. Accordingly, the user input classifier 806 may comprise a machine learning technique, such as feed-forward neural network 816 that may use the MFCC features 814 as inputs and may be trained to recognize gestures based on the inputted vibration pattern features. The gestures may correspond to user commands to control, operate, or interact with the apparatus 100.

In one example, the MFCC may be normalized to be of 36 window frames in time. The resulting topology of the neural network 816 implemented for prototyping may include 36×36 input neurons (total 1296), 100 hidden neurons, and four output neurons (one for each recognized user input type).

A training set may be collected for the user input described in reference to FIG. 2, e.g., with 10 repetitions each. The training results may show a high precision performance of the neural network 816, up to 97.5%. Validation of the resulting neural network model may be performed using a real time routine, where each one of the four gestures may be repeated 20 times; the overall average precision performance across all repetitions and all gestures may reach 90%.

In embodiments, the controller device 110 with the user input determination described above may be implemented over a field-programmable gate array (FPGA) emulation platform designed for wearable device applications. In this platform, the neural network 816 may be implemented as a shifted neural network, which may consume substantially less power (e.g., 1 mW) compared to other neural network implementations. The shifted neural network may be trained in this emulation, with the configured topology of 36×36 inputs (MFCC features), 16 hidden neurons, and two output neurons (two outputs may represent two gestures). Precision performance for user input recognition during training and real-time may be observed to be comparable and consistent to the ones obtained as described above, and performance results to classify MFCC for keyword recognition may prove the technique's feasibility to be used in real life real-time applications.

Figure 9:
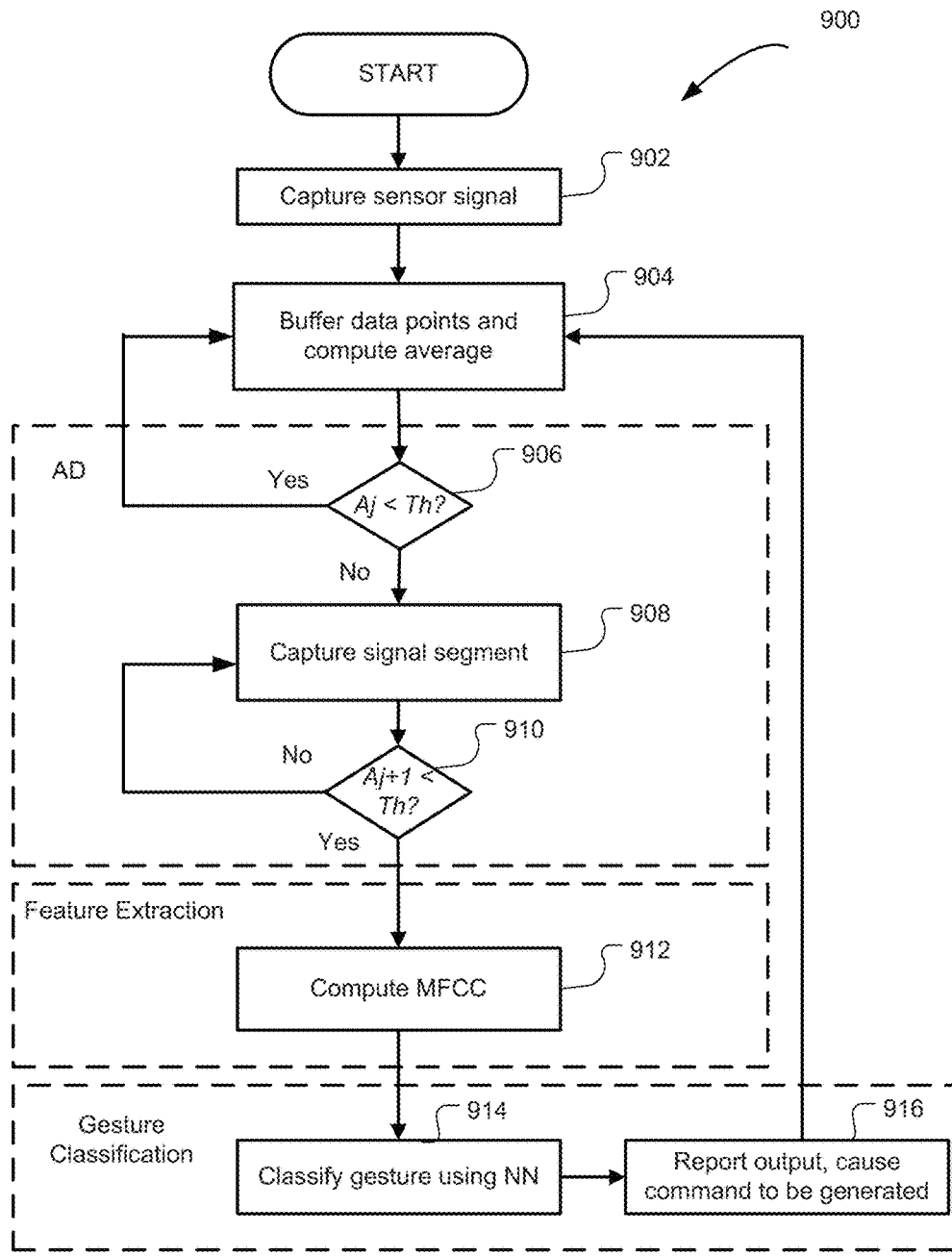
FIG. 9 is an example process flow diagram for determining user commands to an apparatus, based on vibration patterns, in accordance with some embodiments.

FIG. 9 is an example process flow diagram for determining user commands to an apparatus, based on vibration patterns, in accordance with some embodiments. The process 900 may comport with some of the apparatus embodiments described in reference to FIGS. 1-8. The process 900 may be performed by the controller device 110, and more specifically, by the signal processing block 130 of the apparatus 100 of FIGS. 1 and 8. Accordingly, the process 900 is described with continuous reference to FIGS. 1 and 8. In alternate embodiments, the process 900 may be practiced with more or fewer operations, or a different order of the operations.

The process 900 may begin at block 902 and include capturing sensor signals from sensors 106, amplified and conditioned by the amplifier 108. The signals may be generated by the sensors 106 in response to user input and corresponding vibration propagated through the body 102 of the apparatus 100.

At block 904, the process 900 may include buffering of incoming sampled data points corresponding to an epoch of the received signal and computing average amplitude Aj of the given signal's epoch (e.g., time windows that contain 1024 sampled data points) from the buffer. For example, for each 1024 sampled data points the compute amplitude average formula may comprise: $A_j = \Sigma a_i/1024$, wherein i represents incremental sample data points, e.g., $1=1, \ldots$, 1024 sampled data points, and j represents incremental epochs, e.g., $j=1, \ldots$, n epochs (e.g., epoch 1 containing 1024 sample data points, epoch 2 containing subsequent 1024 sample data points, and so on, wherein a is the amplitude of the signal at sampling time i.

At decision block 906, the process 900 may include comparing average amplitude of signal $A_j$ for the buffered data points with a predetermined threshold Th, to detect whether user input occurred during the time period corresponding to the buffered data points. If the average is below the threshold, the process 900 may return to block 904.

If the average amplitude is above the threshold, it may be inferred that the portion of the signal corresponding to the average signal amplitude above the threshold may be indicative of the user input. In other words, the user input may have occurred during the time period in which the average amplitude of the captured signal remained above the threshold. Accordingly, the process 900 may move to block 908, where a segment (portion of signal) corresponding to the above-threshold average amplitude of sensor signal may be captured and stored.

At decision block 910, the process may include comparing average amplitude of signal $A_j+1$ for the next portion of the buffered data points (e.g., another 1024 points) with the predetermined threshold Th. If the average signal amplitude is above the threshold, the process may move to block 908, where the next portion (segment) of the signal corresponding to the detected user input may be captured. If the average signal amplitude is below the threshold, the process may move to block 912. The actions described in reference to blocks 904-910 may be performed by the AD 802 of the signal processing block 130 of FIG. 8.

At block 912, the features indicative of the vibration pattern corresponding to the portion of signal captured at block 908 may be extracted from the captured signal portion. For example, MFCC 814 may be computed, based on the captured signal segment. The actions described in reference to block 912 may be performed by the feature extraction block 804 of the signal processing block 130 of FIG. 8.

At block 914, a command corresponding to vibration pattern may be identified, based at least in part on the features indicative of the vibration pattern. For example, the neural network 816 may perform gesture classification based on inputted MFCC features, as described in reference to FIG. 8, and therefore a command to control, operate, or interact with the apparatus.

At block 916, the results of the gesture classification may be reported (and used to generate the command to interact, operate or control an apparatus), and thereafter, the process 900 may move to block 904. The actions described in reference to blocks 914-916 may be performed by the classifier 806 (e.g., neural network 816) of the signal processing block 130 of FIG. 8.

Figure 10:
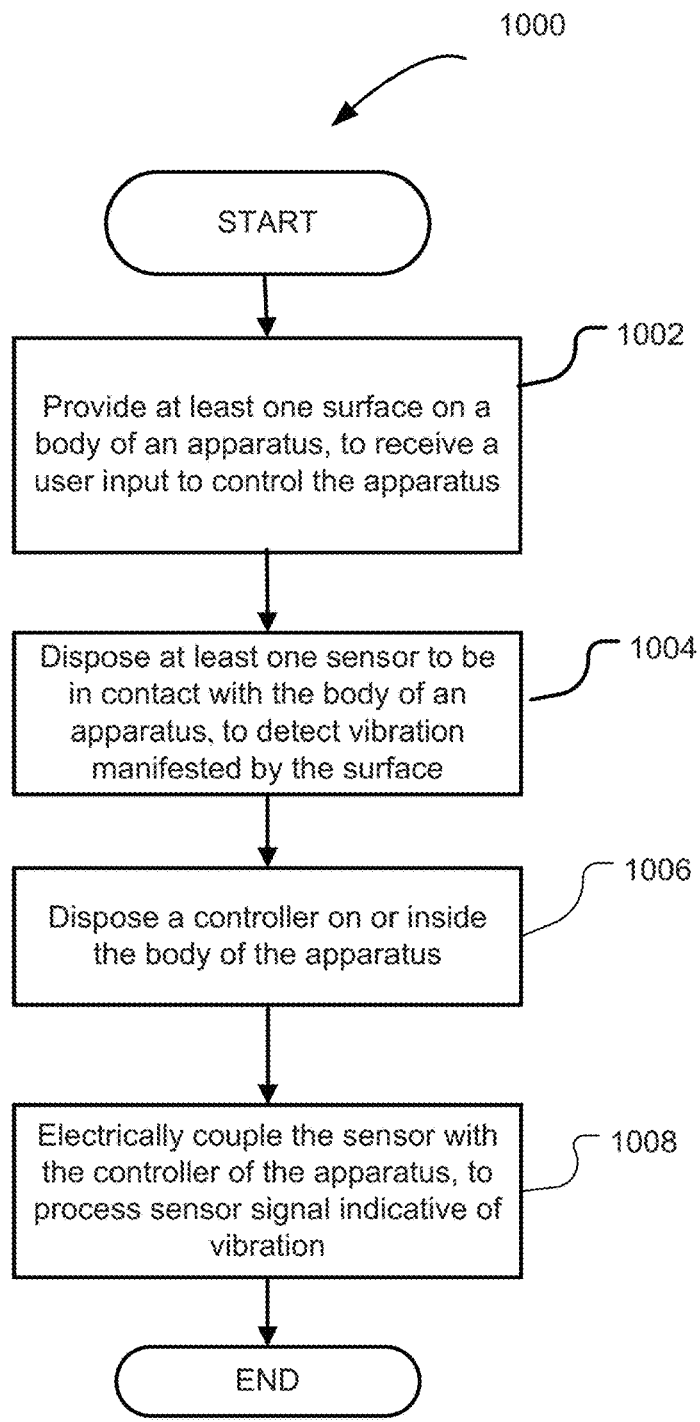
FIG. 10 is an example process flow diagram for manufacturing an apparatus for determination of user commands based on vibration patterns, in accordance with some embodiments.

FIG. 10 is an example process flow diagram for manufacturing an apparatus equipped with the technology for determination of user commands based on vibration patterns, in accordance with some embodiments. The process 1000 may describe manufacturing of the apparatus that comports to the description provided in reference to FIGS. 1, 7, and 8. Accordingly, the process is described with continuous reference to FIG. 1.

The process 1000 may begin at block 1002 and include providing at least one surface for user input (e.g., 104) on a body (102) of an apparatus (100), to receive a user input to control the apparatus. Providing the surface for user input may include forming the surface to include one of: a smooth surface, a rough surface, a surface with a surface pattern, or a combination thereof. The surface pattern may include one or more surface elements disposed in a pattern on the body of the apparatus.

At block 1004, the process 1000 may include disposing at least one sensor (e.g., 106) to be in contact with the body of an apparatus, to detect vibration generated by the surface of the body of the apparatus. Disposing the sensor may include placing the sensor on or inside the body of the apparatus. In embodiments, the sensor may comprise a piezoelectric transducer responsive to vibration.

At block 1006, the process 1000 may include disposing a controller (e.g., 110) on or inside the body of the apparatus.

At block 1008, the process 1000 may include electrically coupling the sensor with the controller, to process the signal indicative of vibration, to identify a pattern of vibration, and determine a command that corresponds to the vibration pattern, based at least in part on a result of the processing of the signal indicative of vibration.

Electrically coupling the sensor with the controller may include electrically coupling the sensor with an amplifier, and electrically coupling the amplifier with the controller. The amplifier may be configured to amplify and condition the signal indicative of vibration provided by the sensor, and to provide the amplified and conditioned signal to the controller for processing.

The following paragraphs describe examples of various embodiments.

Example 1 may be an apparatus for determination of user commands based on vibration patterns, comprising: a body of the apparatus, wherein the body includes at least one surface to receive one or more user inputs to convey a command to the apparatus; at least one sensor disposed to be in contact with the body of the apparatus to detect vibration manifested by the surface in response to the one or more user inputs, and generate a signal indicative of the detected vibration; and a controller coupled with the at least one sensor, to process the vibration-indicative signal, to identify a pattern of vibration, and determine the command based at least in part on the vibration pattern, wherein the command is to interact, operate or control the apparatus.

Example 2 may include the subject matter of Example 1, wherein the controller may further generate the command to interact, operate or control the apparatus, based at least in part on the vibration pattern.

Example 3 may include the subject matter of Example 1, wherein the one or more user inputs may include at least one of: one or more taps, one or more drags, or a combination of the one or more taps and the one or more drags.

Example 4 may include the subject matter of Example 1, wherein the at least one surface may include one of: a smooth surface, a rough surface, a surface with a surface pattern, or a combination thereof, wherein the surface pattern may include one or more surface elements disposed in a pattern on the body of the apparatus.

Example 5 may include the subject matter of Example 1, wherein the at least one sensor may comprise a piezoelectric transducer responsive to vibration.

Example 6 may include the subject matter of Example 1, wherein the controller to identify a vibration pattern includes to: determine that a portion of the signal provided by the at least one sensor is indicative of the user input; extract features indicative of the vibration pattern from the portion of the signal; and identify the vibration pattern, based at least in part on the features.

Example 7 may include the subject matter of Example 6, wherein the features comprise mel-frequency cepstral coefficients (MFCC), wherein to extract features includes to calculate multiple MFCC for the portion of the signal.

Example 8 may include the subject matter of Example 6, wherein to determine the command may include to input the features into a neural network that is trained to recognize the one or more user inputs to the at least one surface, based on the inputted features, wherein the recognized one or more user inputs to the at least one surface indicates the command to interact, operate, or control the apparatus.

Example 9 may include the subject matter of Example 1, further comprising an amplifier coupled with the at least one sensor, to amplify and condition the signal indicative of vibration, and to provide the amplified and conditioned signal to the controller for processing.

Example 10 may include the subject matter of any Examples 1 to 9, wherein the apparatus includes one of: a portable or a wearable device.

Example 11 may include the subject matter of Example 10, wherein the apparatus comprises an eyewear, wherein the at least one surface is disposed on one of: a bridge of a frame of the eyewear, a frontal portion of the eyewear frame, a right side of the eyewear frame, or a left side of the eyewear frame.

Example 12 may be a method for fabrication of an apparatus for determination of user commands based on vibration patterns, comprising: providing at least one surface on a body of an apparatus, wherein the surface is to receive one or more user inputs to convey a command to the apparatus; disposing at least one sensor to be in contact with the body of an apparatus, to detect vibration manifested by the surface in response to the one or more user inputs, and generate a signal indicative of vibration; disposing a controller on or inside the body of the apparatus; and electrically coupling the at least one sensor with the controller, to process the signal indicative of vibration, to identify a pattern of vibration, and determine the command that corresponds to the vibration pattern, wherein the command is to interact, operate or control the apparatus.

Example 13 may include the subject matter of Example 12, wherein disposing at least one sensor to be in contact with the body of an apparatus may include placing the at least one sensor on or inside the body of the apparatus.

Example 14 may include the subject matter of Example 12, wherein providing at least one surface on a body of an apparatus may include forming the at least one surface to include one of: a smooth surface, a rough surface, a surface with a surface pattern, or a combination thereof, wherein the surface pattern may include one or more surface elements disposed in a pattern on the body of the apparatus.

Example 15 may include the subject matter of Example 12, further comprising: providing the at least one sensor, wherein the sensor comprises a piezoelectric transducer responsive to vibration.

Example 16 may include the subject matter of any Examples 12 to 15, wherein electrically coupling the at least one sensor with a controller may include: electrically coupling the at least one sensor with an amplifier, and electrically coupling the amplifier with the controller, to amplify and condition the signal indicative of vibration provided by the at least one sensor, and to provide the amplified and conditioned signal to the controller for processing.

Example 17 may be one or more non-transitory controller-readable media having instructions for determination of user commands based on vibration patterns stored thereon that cause a controller of an apparatus, in response to execution by the controller, to: receive, from at least one sensor disposed to be in contact with a body of the apparatus, a signal indicative of vibration, wherein the signal is generated in response to one or more user inputs to at least one surface of the body of the apparatus; and process the vibration-indicative signal, wherein to process includes to identify a pattern of vibration, and determine the command based at least in part on the vibration pattern, wherein the command is to interact, operate or control the apparatus.

Example 18 may include the subject matter of Example 17, wherein the instructions that cause the controller to process the vibration-indicative signal may further cause the controller to: determine that a portion of the signal provided by the at least one sensor is indicative of the user input; extract features indicative of the vibration pattern from the portion of the signal; and identify the vibration pattern, based at least in part on the features.

Example 19 may include the subject matter of Example 18, wherein the instructions that cause the controller to identify the command may further cause the controller to input the features into a neural network that is trained to recognize the one or more user inputs to the at least one surface, based on the inputted features, wherein the recognized one or more user inputs to the at least one surface indicates the command to interact, operate, or control the apparatus.

Example 20 may include the subject matter of any of Examples 17 to 19, wherein the instructions further cause the controller to generate the command that corresponds to the vibration pattern.

Example 21 may be an apparatus for determination of user commands based on vibration patterns, comprising: means for receiving, from at least one sensor disposed to be in contact with a body of the apparatus, a signal indicative of vibration, wherein the signal is generated in response to one or more user inputs to at least one surface of the body of the apparatus; and means for processing the vibration-indicative signal, including means for identifying a pattern of vibration, and determining the command based at least in part on the vibration pattern, wherein the command is to interact, operate or control the apparatus.

Example 22 may include the subject matter of Example 21, wherein the means for processing the vibration-indicative signal may include: means for determining that a portion of the signal provided by the at least one sensor is indicative of the user input; means for extracting features indicative of the vibration pattern from the portion of the signal; and means for identifying the vibration pattern, based at least in part on the features.

Example 23 may include the subject matter of Example 22, wherein the means for identifying the command may include means for inputting the features into a neural network that is trained to recognize the one or more user inputs to the at least one surface, based on the inputted features, wherein the recognized one or more user inputs to the at least one surface indicates the command to interact, operate, or control the apparatus.

Example 24 may include the subject matter of any of Examples 21 to 23, wherein the apparatus further comprises means for generating the command that corresponds to the vibration pattern.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An eyewear apparatus, comprising:
    a body that includes a frame, and at least one surface to receive one or more user inputs to convey a command to the apparatus through interaction with the at least one surface, wherein the at least one surface includes a surface pattern, wherein the user input includes one or more finger drags along the surface pattern, wherein the surface pattern includes an array of surface elements that are disposed on the surface at increasing distances between each other, wherein a distance between a first surface element and a second surface element that is adjacent to the first surface element is smaller than a distance between the second surface element and a third surface element that is adjacent to the second surface element;
    at least one sensor that comprises a piezoelectric transducer responsive to vibration, wherein the at least one sensor is disposed to be in contact with the body of the apparatus to detect vibration manifested by the surface in response to interaction with the at least one surface to provide the one or more user inputs, and generate a signal indicative of the detected vibration; and
    a controller coupled with the at least one sensor, to process the vibration-indicative signal, to identify a pattern of vibration, and determine the command based at least in part on the vibration pattern, wherein the command is to interact, operate or control the apparatus.

2. The apparatus of claim 1, wherein the controller is further to generate the command to interact, operate or control the apparatus, based at least in part on the vibration pattern.

3. The apparatus of claim 1, wherein the controller to identify a vibration pattern includes to:
    determine that a portion of the signal provided by the at least one sensor is indicative of the user input;
    extract features indicative of the vibration pattern from the portion of the signal; and
    identify the vibration pattern, based at least in part on the features.

4. The apparatus of claim 3, wherein the features comprise mel-frequency cepstral coefficients (MFCC), wherein to extract features includes to calculate multiple MFCC for the portion of the signal.

5. The apparatus of claim 3, wherein to determine the command includes to input the features into a neural network that is trained to recognize the one or more user inputs to the at least one surface, based on the inputted features, wherein the recognized one or more user inputs to the at least one surface indicates the command to interact, operate, or control the apparatus.

6. The apparatus of claim 1, further comprising an amplifier coupled with the at least one sensor, to amplify and condition the signal indicative of vibration, and to provide the amplified and conditioned signal to the controller for processing.

7. The apparatus of claim 1, wherein the apparatus includes one of: a portable or a wearable device.

8. A method, comprising:
    providing at least one surface on a body of an eyewear apparatus, wherein the at least one surface is to receive one or more user inputs to convey a command to the apparatus, wherein providing the at least one surface includes forming a surface pattern, wherein the user input includes one or more finger drags along the surface pattern, wherein the surface pattern includes an array of surface elements, wherein forming the surface pattern includes disposing the surface elements on the surface at increasing distances between each other, wherein a distance between a first surface element and a second surface element that is adjacent to the first surface element is smaller than a distance between the second surface element and a third surface element that is adjacent to the second surface element;
    disposing at least one sensor, comprising a piezoelectric transducer responsive to vibration, to be in contact with the body of the apparatus, to detect vibration manifested by the surface in response to the one or more user inputs, and generate a signal indicative of vibration;
    disposing a controller on or inside the body of the apparatus; and
    electrically coupling the at least one sensor with the controller, to process the signal indicative of vibration, to identify a pattern of vibration, and determine the command that corresponds to the vibration pattern, wherein the command is to interact, operate or control the apparatus.

9. The method of claim 8, wherein disposing at least one sensor to be in contact with the body of an apparatus includes placing the at least one sensor on or inside the body of the apparatus.

10. The method of claim 8, wherein electrically coupling the at least one sensor with a controller includes:
    electrically coupling the at least one sensor with an amplifier, and electrically coupling the amplifier with the controller, to amplify and condition the signal indicative of vibration provided by the at least one sensor, and to provide the amplified and conditioned signal to the controller for processing.

11. One or more non-transitory controller-readable media having instructions stored thereon that cause a controller of an eyewear apparatus, in response to execution by the controller, to:
    receive, from at least one sensor that comprises a piezoelectric transducer responsive to vibration and disposed to be in contact with a body of the apparatus, a signal indicative of vibration, wherein the signal is generated in response to one or more user inputs to at least one surface of the body of the apparatus, wherein the at least one surface includes a surface pattern, wherein the one or more user inputs includes one or more finger drags along the surface pattern, wherein the surface pattern includes an array of surface elements that are disposed on the surface at increasing distances between each other, wherein a distance between a first surface element and a second surface element that is adjacent to the first surface element is smaller than a distance between the second surface element and a third surface element that is adjacent to the second surface element and process the vibration-indicative signal, wherein to process includes to identify a pattern of vibration, and determine a command based at least in part on the vibration pattern, wherein the command is to interact, operate or control the apparatus.

12. The non-transitory controller-readable media of claim 11, wherein the instructions that cause the controller to process the vibration-indicative signal further cause the controller to:

determine that a portion of the signal provided by the at least one sensor is indicative of the user input;

extract features indicative of the vibration pattern from the portion of the signal; and identify the vibration pattern, based at least in part on the features.

13. The non-transitory controller-readable media of claim 12, wherein the instructions that cause the controller to identify the command further cause the controller to input the features into a neural network that is trained to recognize the one or more user inputs to the at least one surface, based on the inputted features, wherein the recognized one or more user inputs to the at least one surface indicates the command to interact, operate, or control the apparatus.

14. The non-transitory controller-readable media of claim 11, wherein the instructions further cause the controller to generate the command that corresponds to the vibration pattern.

* * * * *